Patented Aug. 4, 1942

2,292,207

UNITED STATES PATENT OFFICE 2,292,207

RECOVERY OF METAL

Le Roy M. Dearing, Rochester, N. Y., assignor to Eastman Kodak Company, Rochester, N. Y., a corporation of New Jersey No Drawing. Application May 9, 1941, Serial No. 392,777

12 Claims. (Cl. 75—109)

This invention relates to the recovery of metal and in particular to the recovery of silver from acid-oxidizing solutions thereof such as are obtained in certain photographic processes.

A large number of methods of metal recovery have been described in the art. That is, in certain metallurgical processes the metals become dissolved in cyanide solution and thereafter zinc and copper may be employed to cause the precipitation from the cyanide solution of the metal to be recovered. Such type process is discussed in "Hydrometallurgy of Silver" by Hofmann. In industry there have been obtained large amounts of so-called hypo solutions. The recovery of the components from such solutions by a number of procedures has been described. Likewise, in these processes, there have been described the use of zinc, scrap iron, and the like materials which have been added to the hypo. While certain of the described processes have been of questionable economic value, when utilized in the treatment of heretofore known solutions and liquids difficulty of extreme gas evolution has not been encountered.

However, in more recently developed processes substantially different types of solutions containing metallic components such as silver or silver salts have been obtained. The attempted application of prior art procedure to such recently produced solutions has been unsatisfactory for a number of reasons. For example, it is well stated in Hofmann, referred to above: "As soon as its expense exceeds the value of the recovered metal, a method ceases to be practicable, no matter how interesting it may be." However, all the difficulties have not been from the economic standpoint, but attempted recoveries of metal under the more recent technological conditions of operation have introduced problems of the generation of large quantities of hydrogen which in turn introduces the problem of installation of safety devices, venting systems, and the like to handle large quantities of gases. In addition many of the liquids employed are relatively corrosive, involving problems of rendering the solutions of such neutralized character that they may be disposed of in conventional manners, as for example by discharge to waste through sewers.

After considerable experimentation and observation I have discovered the apparent reason for a number of the aforesaid difficulties and procedure whereby such relatively corrosive solutions may be treated not only to recover metallic components therefrom but, if desired, to render the solutions less corrosive and objectionable. I have also been able to develop a process which is not only satisfactory in being relatively simple and economical to operate, but is free from technological difficulties which have surrounded the attempted use of prior art processes.

This invention has for one object to provide a method of recovering silver from certain photographic materials. A still further object is to provide a relatively simple and economical method for the recovery of metal components in the presence of relatively corrosive acid-oxidizing liquids. A still further object is to provide a method not only whereby the metal may be recovered economically in a relatively high-grade, pure condition, but wherein the corrosiveness of the liquid is reduced or negatived sufficiently to permit its disposal in a conventional manner. A still further object is to provide a process of silver recovery particularly adapted to the recovery of silver involved in motion picture film treatment. Other objects will appear hereinafter.

Inasmuch as my method of metal recovery is particularly adapted to the recovery of silver in certain photographic solutions, I will describe my process particularly in this environment. In addition it is pointed out that this field represents, from the practical and industrial standpoint, one wherein it would be desired to practice to a substantial extent metal recovery processes. As already referred to, and as known in the art, in the past solutions of metal treated have been comprised in many instances of what is known as hypo solutions, hypo being the general designation of photographic fixing agents exemplified by sodium hyposulfite.

In my process, however, the silver either from negative or positive films, or even color films, would be at least to some extent put into solution by an acid-oxidizing liquid. Details of this aspect will be set forth hereinafter, it being sufficient at this point merely to indicate that such liquids may comprise relatively vigorous oxidizing substances such as potassium permanganate, dichromates in the presence of various inorganic acids and other components.

Hence, when prior art methods of silver recovery have been attempted on such metal-containing liquids, unsatisfactory results have been obtained. For example, sulfites or disulfites and soluble chloride have been added in an attempt to reduce the oxidizing components and cause the metal to precipitate as an insoluble chloride. However, such methods result in the liberation of large quantities of sulphur dioxide and the silver is precipitated in such an extremely fine form that either losses of the silver salt are experienced when attempting to separate the salt as by filtration, or the expense of a large number of filters would be required.

Or, when it has been attempted to use more economic reducing materials such as cast iron, extremely vigorous evolution of hydrogen has been evolved not only in some instances presenting the problems of frothing and possible losses of metal values from this difficulty, but the presence of large quantities of hydrogen, due to its explosive nature introduces this hazard.

Inasmuch as the metal components involved in these acid-oxidizing liquids obtained industrially may be in substantial quantities and may have considerable monetary value, it is apparent that the development of procedure whereby their waste can be prevented is a highly desirable result. While the experience with prior art processes has indicated their general unsatisfactoriness, after considerable investigation I have found not only what I believe to be the reason for some of these difficulties, but the application of certain factors whereby difficulties may be eradicated or minimized and the valuable metal components are recovered.

Continuing with the application of my process to the recovery of silver from either positive or negative or other type film, the dissolving of the metallic component (either silver, silver salts, or the like) in the acid-oxidizing solution of a character which will be identified in greater detail hereinafter, would be carried out. In accordance with my method the silver component may be simply and effectively precipitated from such active and corrosive solutions without undue gas evolution provided certain precautions and conditions are maintained in the material used to carry out the precipitation. In my new process not only is the metal component (silver in the instance under consideration) caused to be precipitated in a condition of purity, but it is further possible to render the solutions more or less reduced thereby rendering their subsequent handling less problematical. That is, not only may the recovery of the silver be caused to take place without disadvantageous gas liberation, but by the proper employment of conditions, as will be set forth in detail, simultaneously with the metal recovery, the acid-oxidizing solutions may be converted to a condition having such a pH that it will no longer be damagingly corrosive. Therefore, the waste solution may be readily disposed of to waste through the ordinary sewer drain without danger of damage to the drain traps and the like.

I have found that metals in the electromotive series higher than the metal to be recovered, may be employed in treating the aforesaid acid-oxidizing solutions provided due regard is had for the composition and crystalline form of the metal. Inasmuch as from the economic standpoint ferrous metals are the lowest in cost I will confine my disclosure largely to such metals. I have found that both the composition of steel and iron and the crystalline form or structure have a profound effect upon their successful employment in my novel processes. By the proper choice of iron having certain compositions and structure I have found that silver may be readily deposited out of acid-oxidizing solutions in a state of greater than 90% pure silver and at the same time the corrosiveness of the solution reduced. Considering the silver to be dissolved in sulphuric acid-potassium permanganate media which may or may not have a certain content of sodium sulphate or the like, while I do not wish to be bound by any theories concerning the operation of my process, for a better understanding hereof it is pointed out that reactions somewhat as follows may take place:

1. $H_2SO_4 + Fe = FeSO_4 + H_2$
2. $2KMnO_4 + 10FeSO_4 + 8H_2SO_4 = K_2SO_4 + 2MnSO_4 + 5Fe(SO_4)_3 + 8H_2O$
3. $5H_2 + 2HMnO_4 + 2H_2SO_4 = 2MnSO_4 + 8H_2O$
4. $AgSO_4 + Fe = Ag + FeSO_4$

However, as indicated, not all ferrous metals function satisfactorily and after extended investigation it was discovered that the composition and crystalline structure have great effect upon the results. That is, a ferrous metal having too high a carbon content and too coarse a crystalline structure would not be satisfactory. A better appreciation of this aspect of my invention may be had from a consideration of the following wherein I have set forth a form of measurement for determining which types of ferrous metal may be suitable:

| Identification | Carbon | Manganese | Phosphorus | Sulfur | Silicon | Nickel |
|---|---|---|---|---|---|---|
| Malleable cast iron | 2.5 | 0.4 | 0.2 | 0.10 | 1.0 | |
| Gray cast iron | 3.3 | 0.6 | 0.3 | 0.12 | 2.5 | |
| Malleable steel 1010 | 0.10 | 0.45 | 0.05 | 0.05 | | |
| Cast steel: | | | | | | |
| (a) Bor No. 4 | 0.20 | 0.67 | | | 0.50 | |
| (b) Bor No. 2 | 0.35 | 0.67 | | | 0.50 | |
| (c) Bor No. 3 | 0.46 | 0.67 | | | 0.50 | |
| (d) Bor No. 1 | 0.20 | 0.67 | | | 0.50 | 2.35 |

Turnings were made from all of the above and tested as follows:

58 grams of turnings were put into a two liter beaker fitted with air agitation. Acid bleach was then run in to the extent of 2 liters, and the time noted. When the solution was cleared of permanganate and manganese dioxide, the time was again noted. Each sample was run twice and the results appear below.

| Sample | Time |
|---|---|
| | *Minutes* |
| Malleable cast iron | 18 |
| Gray cast iron | 9 |
| Malleable steel | 31 |
| Cast steel: | |
| Bor No. 4 | 15 |
| Bor No. 2 | 15 |
| Bor No. 3 | *26 (20 min.) |
| Bor No. 1 | 18 |

*NOTE.—It was noted that many of the turnings from Bor No. 3 were straw colored or even blue, indicating that the cuts had been made too deeply. Another sample was then tested using only white turnings, this sample cleared in 20 minutes.

The measurement designated "Time" indicates to some extent the factors of speed of reaction, gas evolution, and the like. It will be observed that the greatest differential is shown between gray cast iron which has a high carbon content and a coarse crystalline structure, for example, and a malleable steel with low carbon content and fine-grain crystalline structure. It, therefore, may be stated that with metallic components functioning in the aforesaid test with a time factor of 10 minutes or lower would be in general unsatisfactory whereas other ferrous components functioning over a period of time greater than 15 minutes would conversely have either one or both low carbon and small crystalline size and produce satisfactory results. In general I would prefer to employ a ferrous metal exhibiting a time factor, in accordance with the foregoing tests, greater than 10 or 12 minutes up to, for example, 40 minutes.

For a more detailed consideration of my process reference is made to the following example. In accordance with this example the silver from photographic negative film had been dissolved in an acid permanganate liquid, as already described. The liquid was brought in contact with a steel of the following composition:

| | |
|---|---|
| Carbon | 0.05–0.15% |
| Manganese | 0.30–0.60% |
| Phosphorus | 0.045% max. |
| Sulphur | 0.055% max. |
| S. A. E. number | 1010 |

The exact physical shape of the steel and manner of contacting the acid-oxidizing solution therewith may be accomplished in various ways. One convenient way would be to employ a series of containers from two or three to a dozen or more in series, positioned at progressively decreased heights for gravity flow. The steel would be in the form of convolutions of metals a few inches wide. In other words, perforated strips of steel would be rolled so that convolutions thereof would be obtained and as many of these as would be desired could be placed in the respective containers and the solution permitted to flow thereover. Such arrangement not only presents satisfactory surface exposure to the solution but exhibits ease of handling and uniform arrangement in the apparatus without possibility of packing which might occur in situations where steel shavings or the like were employed. However, the exact physical shape of the metal and manner of bringing the liquid in contact therewith is not to be considered an undue limitation upon my invention, the foregoing arrangement being set forth primarily for illustrating one of my preferred procedures. Also, it was preferred that in some instances to include in the arrangement for contacting the liquid and ferrous metal, provision for introducing air or other means for further agitating the liquid in contact with the metal.

Upon using the low carbon, small crystalline size steel as aforesaid, approximately 100% yield of silver was obtained in the recovery step in an easily filterable form of exceptional purity. That is, the air dry sludge obtained from the precipitate which was easily filtered from the solution flowed in contact with the steel analyzed better than 92% silver. As indicated, it was of ample size as precipitated to allow separation by filtering or other ordinary means of removing solids from liquid, no losses being encountered through fine deposits passing through the filters.

In addition the acid content of the oxidizing liquid was reduced from about 0.6 normal to 0.3 normal or about 50% neutralized. If it is desired to obtain more complete neutralization this may be accomplished by employing a ferrous metal of a composition between the aforesaid composition and the composition of ordinary cast iron. In other words the pH may be reduced to such a value that it would be substantially non-corrosive, thereby permitting the discharge of liquids to waste in any desired manner.

While I have described my process as applied to an acid permanganate liquid, my invention is not limited in this respect, but functions equally well on, for example, a sulphuric acid-dichromate metal containing liquid. The two acid-oxidizing liquids aforesaid are referred to inasmuch as they constitute examples of certain of the common acid-oxidizing liquids which might be employed. However, there are various acid-oxidizing liquids which might be employed, hence, I do not wish to be restricted in this respect.

While the foregoing procedure in most instances suffices to give sufficiently 100% recovery of metal, as described, in some instances it may be desirable to incorporate in the liquid or otherwise incorporate into the aforesaid reaction in contacting the iron with the acid-oxidizing liquid, a content of a chloride exemplified by sodium chloride, calcium chloride or the like, to assist in the precipitation of the silver. My invention embraces the employment of any such steps of including addition agents tending to place the silver in an insoluble condition.

When I refer to the use of a low carbon and small crystalline size metal in general I refer to compounds having less than 3% carbon and a crystalline structure substantially smaller than the coarse crystalline of gray cast iron, or expressed in another manner, I refer to metals of such compositions and crys.al size which, when employed in accordance with the method set forth in the table, would give a time factor of substantially greater than the 9 minutes allotted to gray cast iron.

It is apparent from the foregoing that I have provided a novel method of recovering valuable metals such as silver, by the use of iron or other metals in the electromotive series lower than iron, even though the handling of acid-oxidizing liquids is involved. My novel method is relatively simple and inexpensive to install and is particularly advantageous in that it permits the recovery of the metal, without disadvantageous gas evolution, in the form of a relatively pure metallic precipitate of filterable size and in recovery efficiency in many instances over 90%.

From the description of my invention it will be apparent that certain changes may be made in my invention without departing from the spirit thereof, hence, I do not wish to be restricted therein excepting insofar as is necessitated by the prior art and the spirit of the appended claims.

What I claim and desire to be secured by Letters Patent of the United States is:

1. A method for recovering silver from film which comprises bathing the film in a solution containing at least one oxidizing reagent from the group consisting of permanganates and dichromates, and also in the presence of at least one inorganic acid or salt thereof, treating the resultant acid-oxidizing solution with ferrous metal having contents of carbon and silicon less than 2.5% and a small crystalline structure substantially smaller than the crystalline size of gray cast iron whereby silver is precipitated, the acid of the liquid reduced, and the oxidizing agent reduced to a harmless salt.

2. The method of rendering acid-oxidizing solutions less corrosive and capable of discharge to waste with reduced corrosiveness which comprises contacting said solutions before they are discharged to waste with a plurality of convolutions of a ferrous metal, said ferrous metal having a low carbon content and small crystalline size substantially smaller than the crystalline size of gray cast iron.

3. In a process for the recovery of silver from acid-oxidizing liquids from color photographic processes containing the same, the step which comprises bringing the liquid in contact with ferrous metal having at least one of the properties of low carbon and small crystalline size.

4. In a process for the recovery of silver, the step of substantially continuously passing the silver-containing solution into contact with a plurality of convolutions of iron having a small crystalline structure substantially smaller than the crystalline size of gray cast iron and a carbon content below 3%.

5. The process in accordance with claim 4 wherein the precipitation of the silver component is supplemented by the introduction of a chloride into the reaction.

6. In a process for the recovery of metals from acidic-oxidizing solutions which comprises contacting the solutions with disseminated metal particles having a low carbon content and a crystalline structure smaller than the crystalline structure of cast iron.

7. In a process for the recovery of silver from acid-oxidizing liquids containing the silver, the improvement steps which comprise contacting the liquids with steel substantially the same as steel S. A. E. No. 1010 which will cause the precipitation thereof without unsatisfactory volume of gas evolution and during the process incorporating a chloride in the system for assisting in precipitating any excess silver.

8. The method of rendering acid-oxidizing photographic solutions less corrosive and capable of discharge to waste to reduce corrosiveness and, also, recovering silver dissolved therein without the evolution of undue quantities of gas which comprises contacting said solutions with a substantial quantity of ferrous metal, said ferrous metal having a carbon content and crystalline size substantially smaller than the carbon content and crystalline size of gray cast iron.

9. The process for treating dichromate acid-oxidizing photographic solutions to render these solutions less corrosive and, also, recovering silver therefrom which comprises contacting said solutions with a steel of carbon content and crystalline size substantially similar to steel S. A. E. No. 1010.

10. The process for treating permanganate acid-oxidizing photographic solutions to render these solutions less corrosive and, also, recovering silver therefrom which comprises contacting said solutions with a steel of carbon content and crystalline size substantially similar to steel S. A. E. No. 1010.

11. A method for rendering acid-oxidizing photographic solutions less corrosive and, also, recovering silver dissolved therein which comprises treating said solutions with a plurality of convolutions of ferrous metal, said ferrous metal having a crystalline size substantially the same as the crystalline size of steel S. A. E. No. 1010.

12. A method for rendering acid-oxidizing photographic solutions less corrosive and, also, recovering silver dissolved therein which comprises treating said solutions with a plurality of convolutions of ferrous metal, said ferrous metal having a carbon content substantially below the carbon content of gray cast iron.

LE ROY M. DEARING.